United States Patent [19]
Willemsen et al.

[11] Patent Number: 5,141,064
[45] Date of Patent: Aug. 25, 1992

[54] LIQUID DAMPING MECHANISM EMPLOYING AN ADJUSTABLE SHEAR PLATE

[75] Inventors: Donald J. Willemsen, Ithaca; John E. Uber, Trumansburg; Steven Del Rosso, Ithaca, all of N.Y.

[73] Assignee: Hi-Speed Checkweigher Co., Inc., Ithaca, N.Y.

[21] Appl. No.: 692,191

[22] Filed: Apr. 26, 1991

[51] Int. Cl.⁵ .......................................... G01G 21/10
[52] U.S. Cl. ........................ 177/184; 177/187; 177/189; 188/285
[58] Field of Search ............. 177/184, 187, 189; 73/522, 526, 430; 188/285, 288

[56] References Cited

U.S. PATENT DOCUMENTS

| | | | |
|---|---|---|---|
| 1,839,373 | 1/1932 | Bryce | 177/184 |
| 2,604,163 | 7/1952 | Exline | 73/430 X |
| 3,027,955 | 4/1962 | McCown | 177/184 |
| 3,221,843 | 12/1965 | Seed | 177/184 |
| 3,354,974 | 11/1967 | Kintner et al. | 177/229 |
| 3,985,190 | 10/1976 | Kammerer et al. | 177/184 |
| 4,428,444 | 1/1984 | Whittaker et al. | 177/187 |
| 4,498,340 | 2/1985 | Duncan | 73/522 X |
| 4,726,435 | 2/1988 | Kitagawa et al. | 177/187 |
| 4,848,495 | 7/1989 | Hayashi | 177/187 |

Primary Examiner—Benjamin R. Fuller
Assistant Examiner—Randy W. Gibson
Attorney, Agent, or Firm—Bean, Kauffman & Spencer

[57] ABSTRACT

A damping mechanism is disclosed for use with a displacement measuring device, such as a load cell of the type immersed in a motion damping liquid contained within a housing. The mechanism includes a shear plate adjustably supported by the housing within the damping liquid for movement towards and away from a facing surface of the load cell, which is supported for movement within a plane disposed parallel to the shear plate, for purposes of controlling the thickness of the layer of damping liquid disposed there-between. The thickness of the layer determines the damping characteristics of the mechanism.

7 Claims, 2 Drawing Sheets

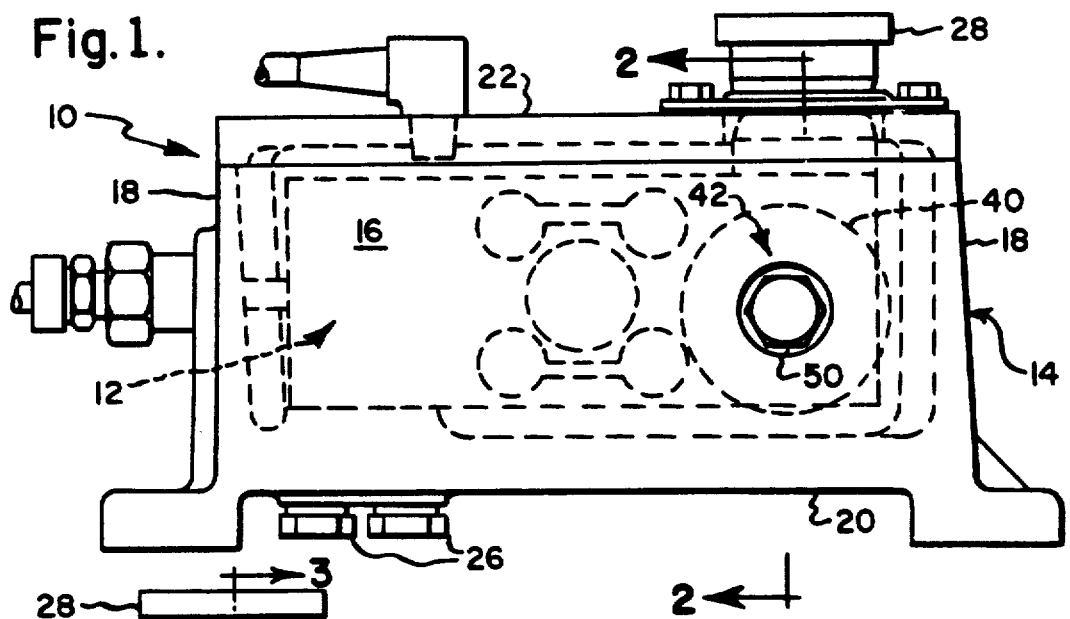
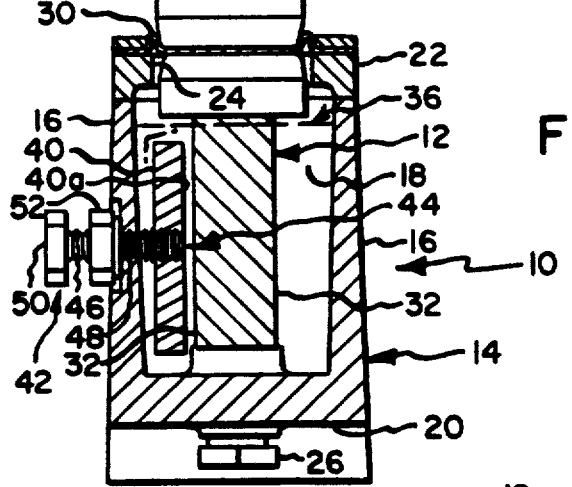
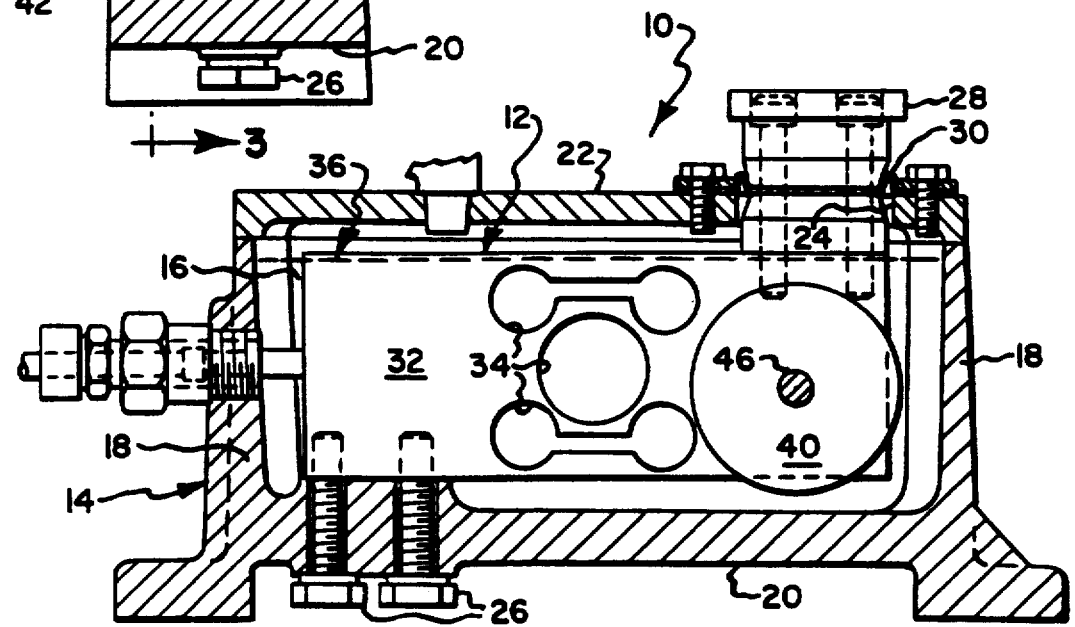

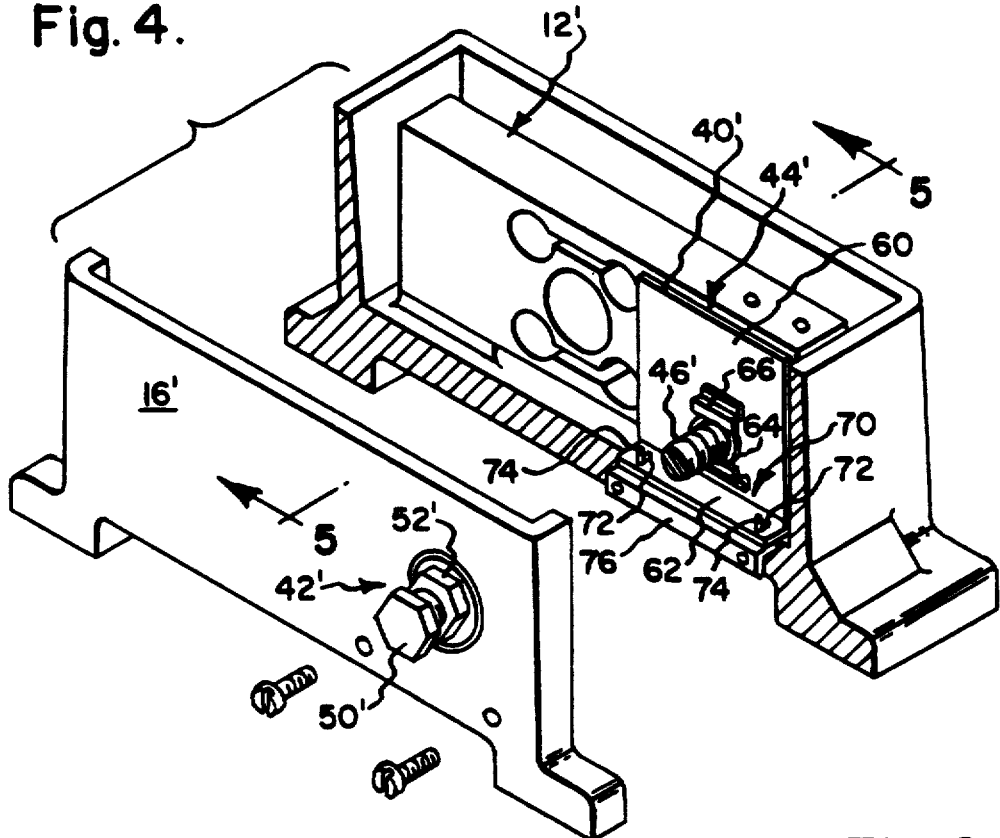
Fig. 4.
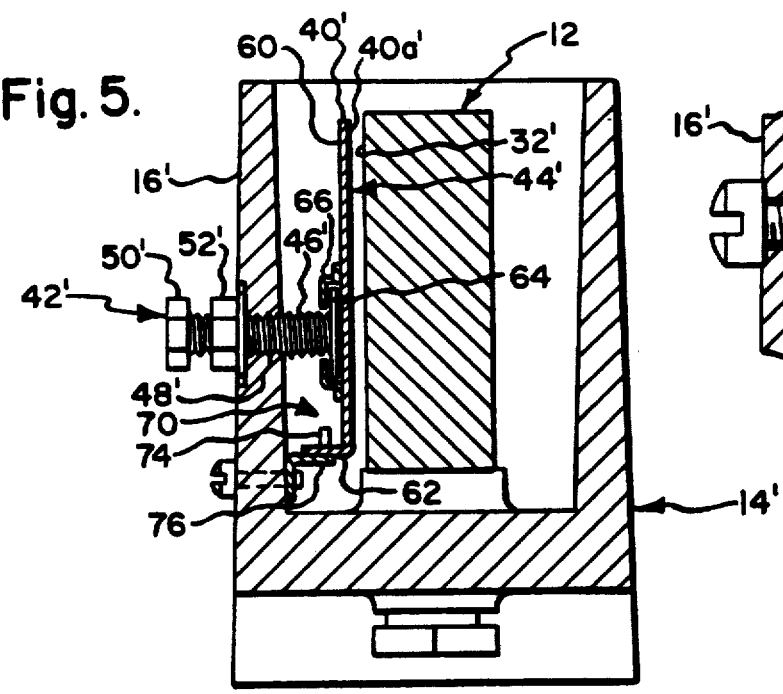
Fig. 5.
Fig. 6.

LIQUID DAMPING MECHANISM EMPLOYING AN ADJUSTABLE SHEAR PLATE

BACKGROUND OF THE INVENTION

It is generally known to employ viscous liquids to dampen vibrations of displacement measuring devices, such as load cell transducers used in weight measuring scales.

In one prior commercial device, a load cell transducer was cantilever supported within a housing and a viscous damping liquid sealed within the housing for purposes of immersing the load cell within the liquid. A problem with this prior device is that its motion damping characteristics cannot be adjusted during use.

It has also been proposed, as evidenced by U.S. Pat. Nos. 4,428,444 and 4,848,495, to provide means to adjust motion damping characteristics of weigh scales employing load cells by controlling the flow of damping liquid passing back and forth through constricted apertures. A problem with these prior devices is that they are relatively structurally complex.

SUMMARY OF THE INVENTION

The present invention generally relates to the hydraulic damping of displacement measuring devices and more particularly to an improvement for the hydraulic damping of load cell transducers employed in weight measuring scales.

In accordance with a preferred form of the invention, a housing serving to support a load cell within a viscous damping liquid is fitted with a shear plate selectively movable by means accessible from exteriorly of the housing for controlling the thickness of liquid disposed between facing surfaces of the shear plate and load cell for purposes of controlling damping of the load cell.

The shear plate may be variously supported by the housing, but two specific embodiments are disclosed. In a first embodiment, the shear plate is in the form of a disc fixed to an inner end of an adjustment screw, which is arranged to pass outwardly through a threaded opening provided in a side wall of the housing and fitted on its outer end with a position locking nut and manual adjustment knob.

In a second disclosed embodiment of the invention, the shear plate is rotatably coupled to the inner end of the adjustment screw and constrained for reciprocating movement relative to the load cell by a pin-slot guiding arrangement coupling the shear plate to the housing side wall.

BRIEF DESCRIPTION OF THE DRAWINGS

The nature and mode of operation of the present invention will now be more fully described in the following detailed description taken with the accompanying drawings wherein:

FIG. 1 is a side elevational view of a weighing scale incorporating the present invention;

FIG. 2 is a sectional view taken generally along line 2—2 in FIG. 1;

FIG. 3 is a sectional view taken generally along line 3—3 in FIG. 2;

FIG. 4 is an exploded, fragmentary perspective view of a weighing scale showing an alternative form of the present invention;

FIG. 5 is a sectional view taken generally along line 5—5 in FIG. 4, but with the scale in assembled condition; and FIG. 6 is an enlarged fragmentary view of a pin-slot guide supporting the shear plate.

DETAILED DESCRIPTION

A weighing scale incorporating the present invention is designated as 10 in FIGS. 1-3. Scale 10 is of conventional construction from the standpoint that it includes a load-cell transducer or movement measuring member 12 cantilever supported within a housing 14 having opposite side walls 16, opposite end walls 18, a bottom wall 20 and a removable top wall 22 formed with an opening 24. One end of load cell 12 is rigidly fixed to housing bottom wall 20, as by bolts 26, and an opposite vertically movable end carries a weighing platform mounting base 28, which projects outwardly through top wall opening 24 and is fluid sealed relative thereto by a flexible seal 30.

Load cell 12 is typically generally hexahedron in form including a pair of generally parallel, planar side surface portions 32 arranged parallel to the direction of movement of mounting base 28 and in a facing, spaced relationship with each of housing side walls 16. Flexure of the load cell 12 under applied load is facilitated by openings 34 extending between side surface portions 32, and suitable strain gauges, not shown, are employed to measure such flexure. Load induced vibrations of load cell 12 are dampened by a charge of a suitable, viscous damping liquid 36 having a volume sufficient to at least substantially completely immerse the load cell such that its side surface portions are wetted by the liquid, as shown in FIGS. 2 and 3.

In a conventional load cell installation of the type described, a damping action is achieved by the shearing action occurring between movable side surface portions 32 of the load cell and the damping liquid in which the load cell is immersed. Thus, by selecting a damping liquid of appropriate viscosity, it has been possible to obtain a range of damping effects.

In accordance with the present invention, the damping effect obtainable with a charge of any given viscous damping liquid may be selectively varied or be user controlled by means accessible exteriorly of housing 14. Specifically, the present invention broadly contemplates the provision of a shear plate 40 formed with a surface 40a, which is preferably planar, and means 42 to support the shear plate such that its surface is arranged in a parallel relationship to one or the other of load cell side surface portions 32 and movable normal relative thereto in order to selectively vary the thickness of a layer 44 of damping liquid disposed therebetween.

When the thickness of layer 44 is reduced to a value less than the thickness of the boundary layer of side surface portion 32 moving through the damping liquid, that is, the distance from such side surface portion at which the velocity gradient of the adjacent liquid under shear is zero, the damping force exerted by the damping liquid is increased, since such force is inversely proportional to the thickness of such layer. Accordingly, adjustments of shear plate 40 towards and away from side surface portion 32 and the resultant adjustments of the thickness of the layer 44 disposed therebetween, may be relied upon to selectively control the damping force to which load cell 12 is exposed. The time required to damp vibration of load cell 12 drops consistently, as the thickness of layer decreases, while the response time of the load cell remains relatively constant.

In the preferred embodiment of the invention shown in FIGS. 1-3, shear plate 40 is of disc-shaped configuration and means 42 is defined by a screw threaded shaft 46 having a first or inner end rigidly fixed to the shear plate, a second or outer end disposed outwardly of housing 14 and an intermediate or midportion adjustably threadably received within a screw threaded opening 48 formed in housing side wall 16. Preferably, the second end of shaft 46 is fitted with a manual adjustment knob 50 and an adjustable lock nut 52 adapted to releasably lock the shaft in a desired adjusted position determined by rotations of the adjustment knob. In this construction, shear plate 40 is rotatable with shaft 46.

FIGS. 4-6 illustrate an alternative embodiment of the invention, wherein elements corresponding to like elements of the embodiment of FIGS. 1-3 are designated by like primed numerals. Specifically, in FIGS. 4-6 shear plate 40' is shown as being of L-shaped configuration defined by a first plate portion 60 forming surface 40a' and a second plate portion 62; and means 42' is shown as being defined by a screw threaded shaft 46' having its first or inner end fixed to plate portion 60, its second or outer end fitted with adjustment knob 50' and lock nut 52' and its intermediate or mid portion received within screw threaded opening 48' formed in side wall 16' of housing 14'. The construction of load cell 12' may be identical to load cell 12.

In the embodiment of FIGS. 4-6, shaft 46' is rotatably coupled to shear plate 40', such as by fitting the first end of the shaft with a disc 64 rotatably received within a hollow boss 66 rigidly fixed to first plate portion 60 remotely of surface 40a'; and means 42' additionally includes guide means 70 for constraining shear plate 40' for sliding or reciprocating movement towards and away from side surface portion 32' for purposes of varying the thickness of layer 44'. In the illustrated construction, guide means 70 includes a pin-slot device defined by parallel slots 72 formed in second plate portion 62 a pair of guide pins 74 arranged to upstand from a housing side wall affixed support bracket 76 for receipt one within each of slots 72.

It is anticipated that shear plates 40 and 40' may be arranged for cooperation with one or both of side surface portions 32 and 32'. It is also anticipated that the present invention possesses utility in controlling damping of diverse art devices, wherein a member is movable in response to an applied load and immersed in a viscous motion damping liquid.

What is claimed is:

1. A displacement measuring device comprising in combination:
   a housing for containing a viscous motion damping liquid;
   a member supported for movement relatively within said housing and having a generally surface portion immersed within said liquid and arranged parallel to said movement, said liquid tending to dampen movement of said member relative to said housing;
   a shear plate having a surface; and
   means for supporting said shear plate within said housing to arrange said surface parallel to said surface portion and to adjustably move said surface towards and away from said surface portion to adjustably control a thickness of a layer of said liquid disposed therebetween for varying the damping effect of said liquid on said member, said means including a shaft having one end fixed to said shear plate and a second end, an opening extending through said housing for adjustably receiving said shaft intermediate said one end and second end thereof, whereby to position said one end and said second end inwardly and outwardly of said housing, respectively, and said thickness of said layer is controlled by motion imparted to said second end of said shaft.

2. A device according to claim 1, wherein said shaft and said opening are screw threaded to permit rotation and axial displacement of said shaft relative to said opening, and lock means are provided for releasably retaining said shaft in an adjusted position relative to said opening.

3. A device according to claim 1, wherein said means includes guide means for slidably supporting said shear plate for reciprocating movement towards and away from said surface portion, said shaft and said opening are screw threaded and said one end is fixed to said shear plate for rotation relative thereto about an axis of rotation of said shaft, and means for releasably retaining said shaft in an adjusted position relative to said opening.

4. In an apparatus for measuring weight having a load cell supported for movement within a housing containing a viscous motion damping liquid in which said load cell is immersed, said load cell having side surface portions disposed parallel to a direction of movement of said load cell relative to said housing, and said housing having side walls facing said side surface portions, the improvement providing for adjustably controlled damping of movement of said load cell, said improvement comprising in combination:
   shear plate having a surface; and
   means for supporting said shear plate on one of said side walls to maintain said surface in a facing parallel relationship to one of said side surface portions and move said surface towards and away from said one of said side surface portions for varying a thickness of a layer of said liquid disposed therebetween for varying a damping effect of said liquid on said load cell, said means for supporting said shear plate including a shaft having a first end fixed to said shear plate and a second end, an opening extending through said one of said side walls for adjustably supporting said shaft intermediate said first and second end for displacements lengthwise thereof and to position said first and second end inwardly and outwardly of said housing, respectively, and said thickness of said layer is varied by motion imparted to said second end of said shaft.

5. The improvement according to claim 4, wherein said shaft and said opening are screw threaded, said shear plate is fixed for rotation with said first end, said surface is generally circular and a retaining nut carried by said second end for releasably retaining said shaft in adjusted position within said opening.

6. The improvement according to claim 4, wherein said means for supporting said shear plate additionally includes guide means for constraining said shear plate for sliding movement towards and away from said load cell, said shaft and said opening are screw threaded, and said first end is fixed to said shear plate for rotation relative thereto about an axis extending lengthwise of said shaft.

7. The improvement according to claim 6, wherein said shear plate is of L-shaped configuration defined by first plate portion forming said surface and a second plate portion, and said guide means includes guide pin means supported by said one of said side walls and slot means defined by said second plate portion and sized to slidably receive said guide pin means.

* * * * *